United States Patent
Ohtomo

(10) Patent No.: US 10,189,360 B2
(45) Date of Patent: *Jan. 29, 2019

(54) ELECTRIC CHARGING SYSTEM

(75) Inventor: Yosuke Ohtomo, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 541 days.

This patent is subject to a terminal disclaimer.

(21) Appl. No.: 13/426,679

(22) Filed: Mar. 22, 2012

(65) Prior Publication Data

US 2012/0253715 A1    Oct. 4, 2012

(30) Foreign Application Priority Data

Mar. 31, 2011    (JP) ................. 2011-078295

(51) Int. Cl.
*B60L 11/18*    (2006.01)
*H02J 7/00*    (2006.01)
*H02J 7/04*    (2006.01)

(52) U.S. Cl.
CPC ....... *B60L 11/1816* (2013.01); *B60L 11/1861* (2013.01); *H02J 7/0004* (2013.01); *H02J 7/0072* (2013.01); *H02J 7/045* (2013.01); *B60L 2240/549* (2013.01); *Y02T 10/705* (2013.01); *Y02T 10/7011* (2013.01); *Y02T 10/7044* (2013.01); *Y02T 10/7072* (2013.01); *Y02T 90/14* (2013.01)

(58) Field of Classification Search
CPC ............. B60L 11/1816; B60L 11/1861; B60L 11/1838; B60L 2240/549; B60L 11/1825; B60L 2230/12; B60L 3/003; B60L 3/04; H02J 7/045; H02J 7/0004; H02J 7/008; H02J 7/0086; H02J 7/0008; H02J 7/0093; Y02T 10/7088; Y02T 10/7044; Y02T 10/705; Y02T 10/7005; Y02T 90/163; Y02T 10/7011; Y02T 90/121; Y02T 90/14; Y02T 90/128; Y02T 90/127; H01M 10/44; G01R 19/16542

USPC .......................................................... 702/63
See application file for complete search history.

(56) References Cited

U.S. PATENT DOCUMENTS

| | | | | |
|---|---|---|---|---|
| 5,329,218 A | * | 7/1994 | Rydborn | H02J 7/008 320/139 |
| 5,633,801 A | * | 5/1997 | Bottman | G01R 27/02 324/600 |

(Continued)

FOREIGN PATENT DOCUMENTS

JP    2009-83670 A    4/2009

*Primary Examiner* — Kyle R Quigley
(74) *Attorney, Agent, or Firm* — McDermott Will & Emery LLP

(57) ABSTRACT

In an electric charging system, an electric charger and an electric vehicle is connected via a charging cable, and charging power is provided to a battery of the electric vehicle via the charging cable. The electric charger calculates a voltage drop based on a supply current Is of the electric charger and an electric resistance of the charging cable. The electric charger compares a supply voltage of the electric charger with a determination value, and, if the supply voltage reaches the determination value, determines that the battery is charged to a fully-charged state. The determination value is updated by adding the voltage drop to a preset determination base value so as to take the voltage drop of the charging cable into account.

7 Claims, 8 Drawing Sheets

(56) References Cited

U.S. PATENT DOCUMENTS

| | | | |
|---|---|---|---|
| 6,479,968 B1* | 11/2002 | Pozsgay | H02J 7/0073 320/137 |
| 2006/0031035 A1* | 2/2006 | Brott | G01R 31/006 702/108 |
| 2009/0286414 A1* | 11/2009 | Ohtomo | B60L 11/1803 439/299 |
| 2010/0259223 A1* | 10/2010 | Gale | B60L 11/1811 320/137 |

* cited by examiner

ELECTRIC CHARGING SYSTEM

CROSS REFERENCES TO RELATED APPLICATIONS

The present application claims priority from Japanese Patent Application No. 2011-078295 filed on Mar. 31, 2011, the entire contents of which are hereby incorporated by reference.

BACKGROUND OF THE INVENTION

1. Field of the Invention

The present invention relates to an electric charging system that connects an electric charger and an electric vehicle via a charging cable and charges an electric storage device mounted on the electric vehicle.

2. Description of the Related Art

In recent years, electric vehicles that are equipped with an electric motor for propulsion have been under development. The electric vehicle is equipped with an electric storage device such as battery. Upon charging the electric storage device, a charging cable extending from an electric charger is connected to a charging port of the electric vehicle (see, for example, Japanese Unexamined Patent Application Publication No 2009-83670). Furthermore, in the field of hybrid electric vehicles that are equipped with an engine and an electric motor for propulsion, so called a plug-in type vehicle is under development whose electric storage device can be charged with an electric charger.

Since the charging cable has an electric resistance and an impedance, a voltage drop occurs in the charging cable during charging. Accordingly there is a discrepancy between a supply voltage of the electric charger and a receiving voltage of the electric vehicle, which makes it difficult to highly accurately determine a charge state of the electric charging device based on the supply voltage of the electric charger. Thus, the charge state of the electric charging device cannot be correctly recognized by the electric charger, which makes it difficult for the electric charger to properly perform charging control.

SUMMARY OF THE INVENTION

The present invention aims so prevent an electric charger from mistakenly determining a charge state and to properly perform charging control.

An aspect of the present invention provides an electric charging system that connects an electric charger and an electric vehicle via a charging cable and charges an electric storage device mounted on the electric vehicle, the electric charging system including: a resistance calculating unit for calculating a conduction resistance of the charging cable based on a voltage difference between a supply voltage of the electric charger and a receiving voltage of the electric vehicle; a drop calculating unit for calculating a voltage drop in the charging cable during charging based on the conduction resistance of the charging cable and the supply current of the electric charger; a charge state determining unit that determines a charge state of the electric storage device by comparing the supply voltage of the electric charger and a preset determination value; and a determination value updating unit for updating the determination value based on the voltage drop.

Preferably, the determination value updating unit should update the determination value by adding the voltage drop to a preset determination base value.

Preferably, the conduction resistance of the charging cable should be an electric resistance or an impedance of the charging cable.

Preferably, the resistance calculating unit, the drop calculating unit, the charge state determining unit and the determination value updating unit should be provided at the electric charger.

Preferably, the receiving voltage of the electric vehicle should be transmitted to the resistance calculating unit via a communication line in the charging cable.

Preferably, the electric charging system should include a supply-side processing unit for calculating supply voltage data by applying a predetermined filtering process so the supply voltage of the electric charger; a receiving-side processing unit for calculating receiving voltage data by applying a predetermined filtering process to the receiving voltage of the electric vehicle; a feature point, assigning unit for assigning a feature point to the supply voltage data and the receiving data by altering at least any one of the supply voltage of the electric charger, the supply current of the electric charger, the receiving voltage of the electric vehicle and a receiving current of the electric vehicle; a data synchronizing unit for synchronizing the supply voltage data and the receiving voltage data based on the feature point assigned to the supply voltage data and the receiving data; and a voltage difference calculating unit for calculating a voltage difference between the supply voltage of the electric charger and the receiving voltage of the electric vehicle.

Preferably, the feature point assigning unit should assign a feature point to the supply voltage data and the receiving voltage dada by altering the supply current of the electric charger or the receiving voltage of the electric vehicle.

Preferably, the data synchronizing unit should calculate a time lag between the supply voltage data and the receiving voltage data based on the feature point and synchronize the supply voltage data and the receiving voltage data based on the time lag.

According to the present invention, the determination value with which the supply voltage of the electric charger is to be compared is updated based on the voltage drop in the charging cable, thereby preventing the electric charger from mistakenly determine a charge state. As a result, the electric storage device can be properly charged so that a poor charge state thereof can be prevented.

DESCRIPTION OF THE PREFERRED EMBODIMENTS

Figure 1:
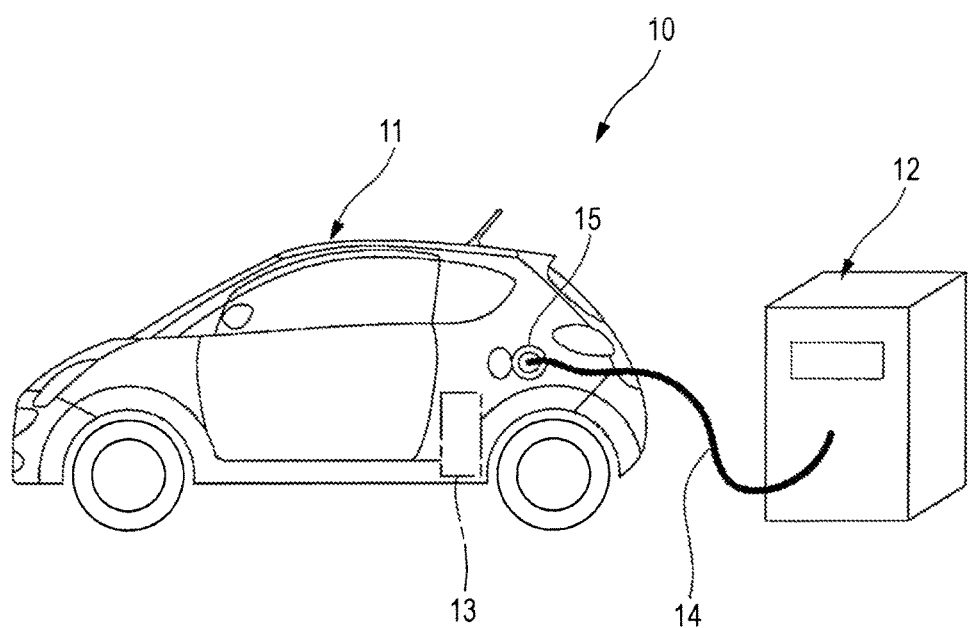
FIG. 1 is a schematic diagram showing a case in which charging is preformed with an electric charging system according to an embodiment of the present invention.
Figure 2:
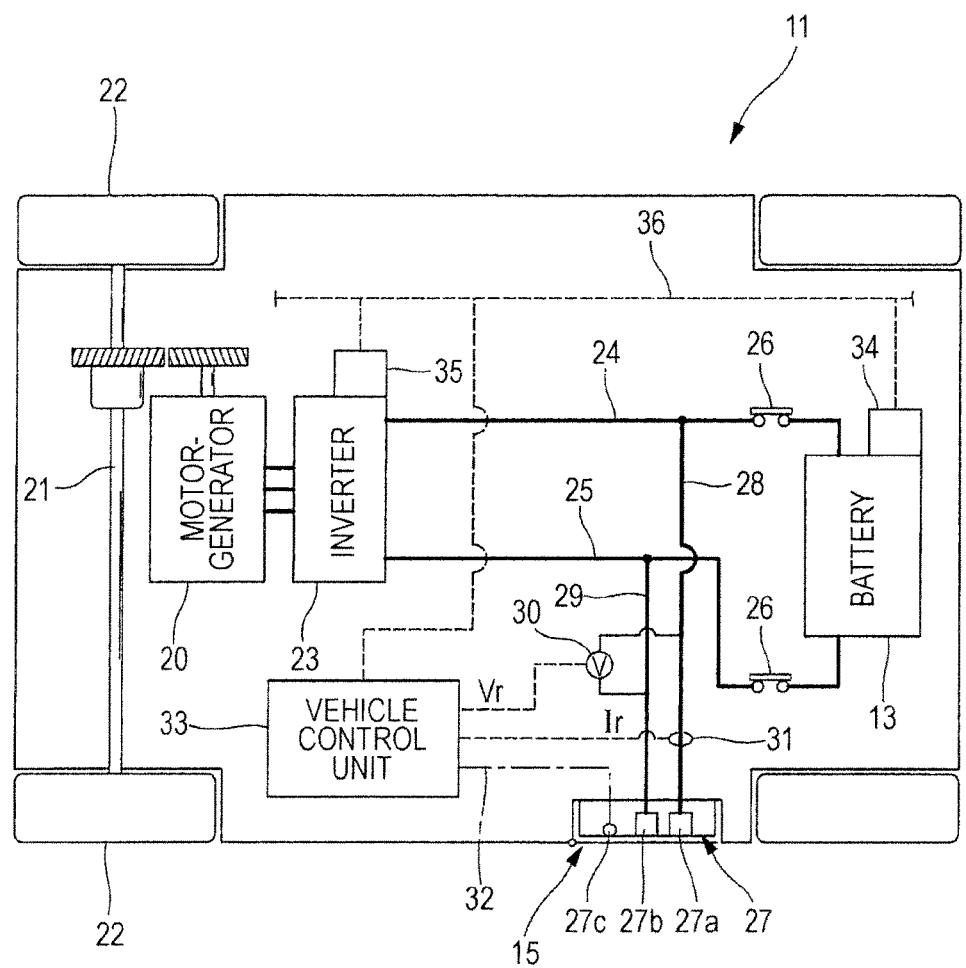
FIG. 2 is a schematic diagram showing an internal structure of an electric vehicle constituting the electric charging system.
Figure 3:
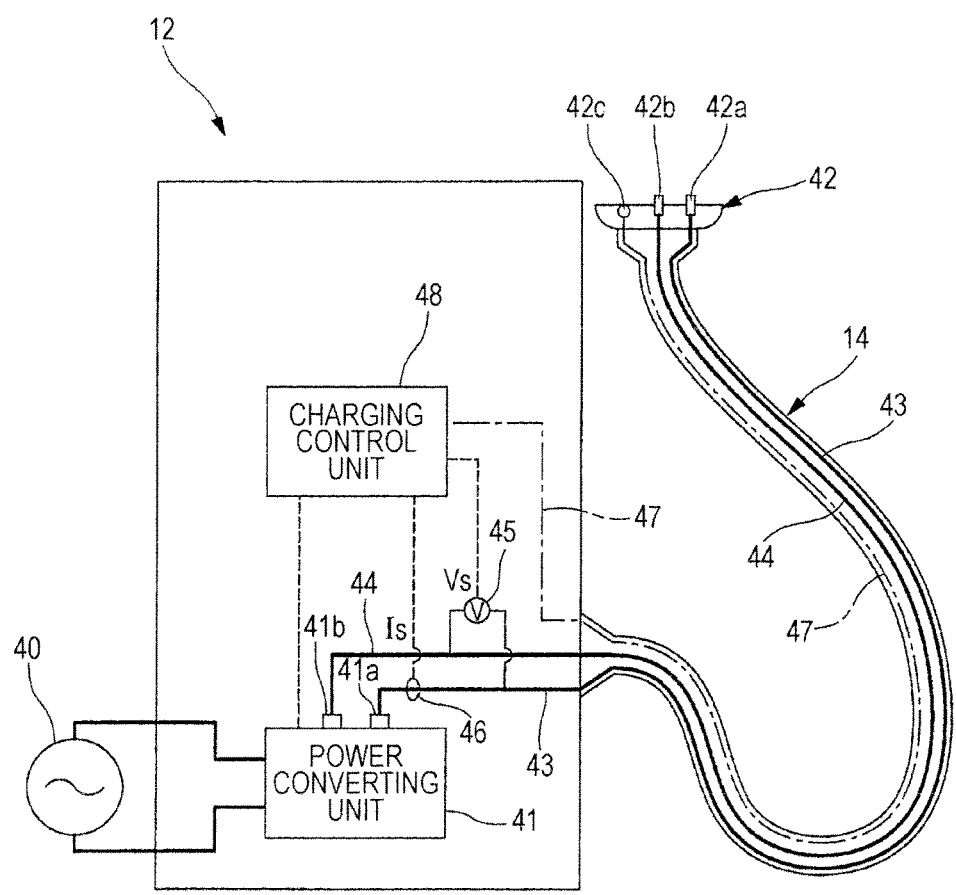
FIG. 3 is a schematic diagram showing an internal structure of an electric charger constituting the electric charging system.

An embodiment of the present invention will hereunder be described with reference to the drawings. FIG. 1 is a schematic diagram showing a case in which charging is preformed with an electric charging system 10 according to an embodiment of she present invention. FIG. 2 is a schematic diagram showing an internal structure of an electric vehicle 11 constituting the electric charging system 10. FIG. 3 is a schematic diagram showing an internal structure of an electric charger 12 constituting the electric charging system 10. As shown in FIG. 1 the electric vehicle 11 is provided with a battery 13 as an electric storage device. When the battery 13 is charged, a charging cable 14 of the electric charger 12 is connected to a charging port 13 of the electric vehicle 11. The electric charger 12 charges the battery 13 so a predetermined state-of-charge (SOC), controlling a charging current and a charging voltage to be supplied to the electric vehicle 11.

As shown in FIG. 2, the electric vehicle 11 includes a motor-generator 20 for propulsion that is connected to drive wheels 22 via a drive axle 21. The motor-generator 20 is connected to the battery 13 via an inverter 23 that bidirectionally converts DC power and AC power. The battery 13 and the inverter 23 are connected by current carrying lines 24 and 25. Each of the current carrying lines 24 and 25 has a main relay 26. The charging port 15 disposed at a side of the vehicle body is provided with a power receiving connector 27. The power receiving connector 27 has a pair of power receiving terminals 27a and 27b. The power receiving terminal 27a is connected to the current carrying line 24, which is disposed on a positive electrode side, via a power receiving line 23. The power receiving terminal 27h is connected to the current carrying line 25, which is disposed on a negative electrode side, via a power receiving line 29. The electric vehicle 11 has a voltage sensor 30 that detects a voltage of the power receiving lines 28 and 29, that is, a receiving voltage Vr, as well as a current sensor 31 that detects a current of the power receiving line 28, that is, a receiving current Ir. The power receiving connector 27 has a signal terminal 27c that is connected to a communication line 32. The electric vehicle 11 includes a vehicle control unit 33 for integrally controlling the entire vehicle, a battery control unit 34 for controlling the battery 13, and a motor control unit 35 for controlling the inverter 23. The control units 33 to 35 are connected to each other via a communication line 36. Each of the control units 33 to 35 is equipped with a CPU, a memory and the like.

As shown in FIG. 3, the electric charger 12 has a power converting unit 41 that converts AC power from an external power source 40 to DC power for charging. The power converting unit 41 includes a rectifier circuit, an electric transformer, a switching circuit, and the like. At an end of the charging cable 12 of the electric charger 14 is provided a power supply connector 42 that is attachable and detachable with respect to the power receiving connector 27. The power supply connector 42 has a pair of power supply terminals 42a and 42b that correspond to the power receiving terminals 27a and 27b of the power receiving connector 27. The power supply terminal 42a is connected to a positive electrode terminal 41a of the power converting unit 41 via a power supply line 43, while the power supply terminal 42b is connected to a negative electrode terminal 41b of the power converting unit 41 via a power supply line 44. The electric charger 12 has a voltage sensor 45 that detects a voltage of the power supply lines 43 and 44, that is, a supply voltage Vs, as well as a current sensor 46 that detects a current of the power supply line 43, that is, a supply current Is. The power supply connector 42 has a signal terminal 42c that is connected to a communication line 47. The electric charger 12 includes a charging control unit 48 that is equipped with a CPU, a memory and the like. The charging control unit 48 transmits a control signal to the power converting unit 41.

Figure 4:
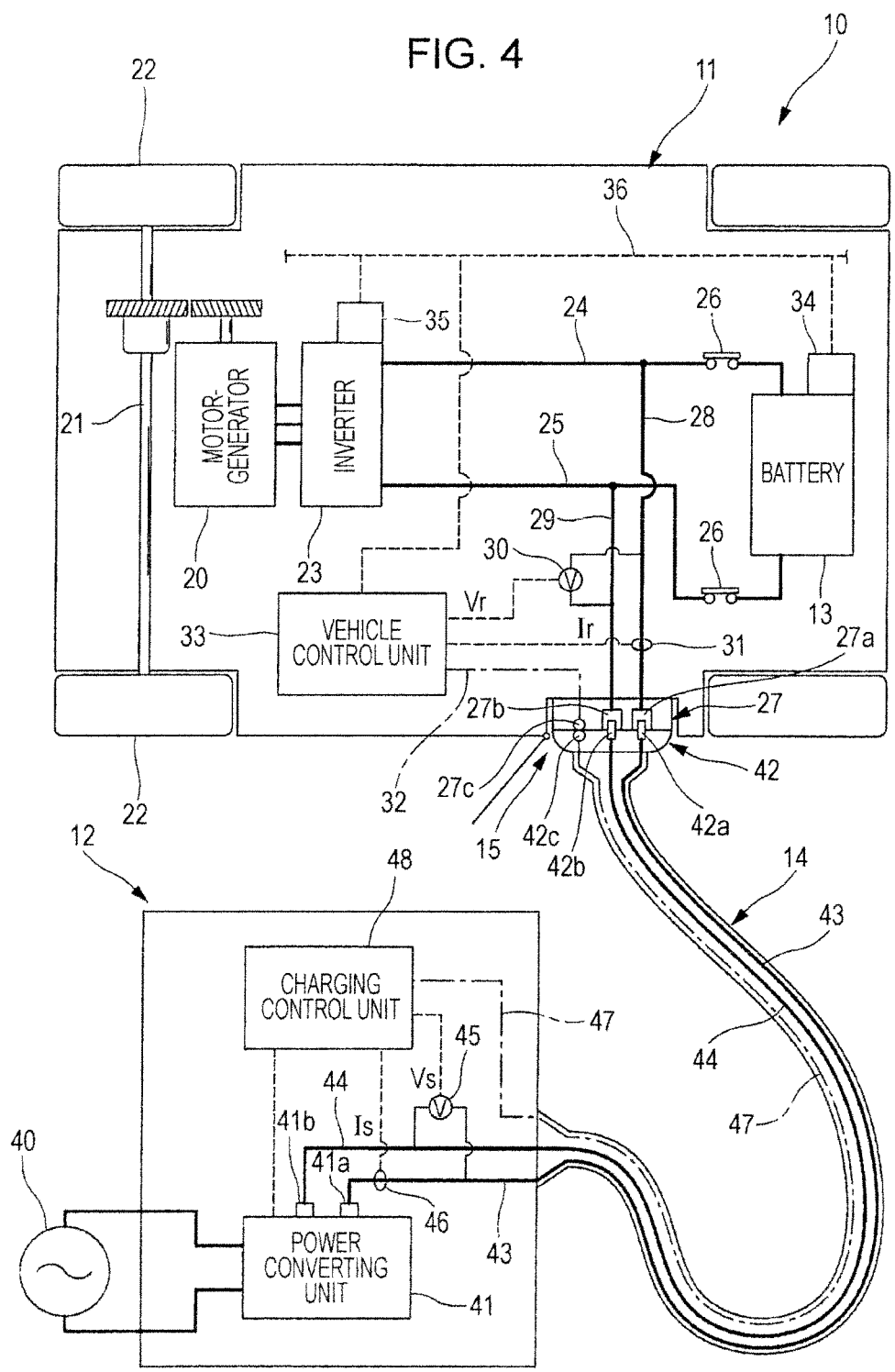
FIG. 4 is a schematic diagram showing a state where a charging cable of the electric charger is connected so a charging port of the electric vehicle.

FIG. 4 is a schematic diagram showing a state where the charging cable 14 of the electric charger 12 is connected to the charging port 15 of the electric vehicle 11. As shown in FIG. 4, connecting the power supply connector 42 of the charging cable 14 to the power receiving connector 27 of the charging port 15 causes a state where the power converting unit 41 and the battery 13 are connected to each other via the power supply lines 43 and 44 and the power receiving lines 23 and 29. Furthermore, connecting the power supply connector 42 of the charging cable 14 to the power receiving connector 27 of the charging port 15 causes a state where the vehicle control unit 33 and the charging control unit 48 are connected to each other via the communication lines 32 and 47. When the electric charger 12 and the electric vehicle 11 are connected to each other via the charging cable 14 in this manner, the charging control unit 48 of the electric charger 12 charges the battery 13 until the supply voltage Vs reaches a predetermined detection value Xb by controlling the power converting unit 41. The charging control unit 48 assures a fully charged state of the battery 13 by continuing to charge the battery 13 until the supply voltage Vs reaches the preset determination value Xb.

Figure 5:
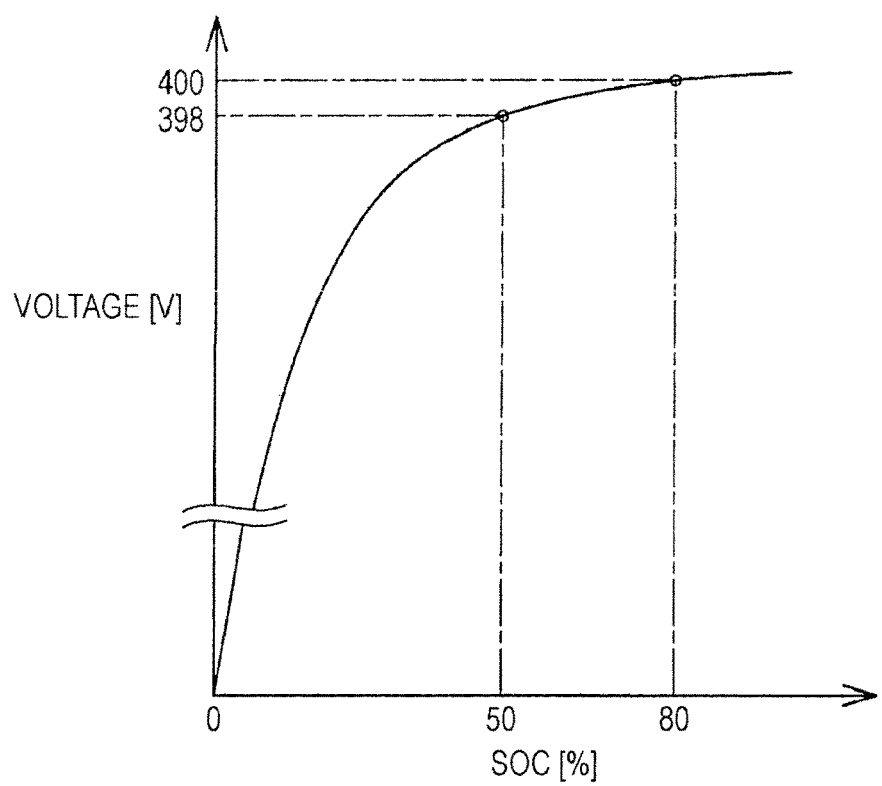
FIG. 5 is a diagram showing an example of battery charge/discharge characteristics.

Since the charging cable 14 connected to the electric vehicle 11 has an electric resistance (conduction resistance) R, a voltage drop occurs in the charging cable 14 when the electric charger 12 supplies electric power to the electric vehicle 11. Thus, the supply voltage Vs and the receiving voltage Vr are different from each other by a voltage drop $\Delta$Va in the charging cable 14. Since the supply voltage Vs of the electric charger and the receiving voltage of the battery do not agree with each other, it is difficult to assure a fully charged state of the battery 13 simply by continuing to charge until the supply voltage Vs reaches to the predetermined voltage. FIG. 5 is a diagram showing an example of battery charge/discharge characteristics. As shown in FIG. 5, when the SOC of the battery 13 is 50%, the voltage thereof exhibits 398 V. When the SOC of the battery 13 is 80%, the voltage thereof exhibits 400 V. If battery charge/discharge characteristic shows a small difference in the battery voltage and a large difference in the SOC like this example, it is difficult to assure a fully charged state of the battery 13 using the battery 13. As shown in FIG. 5, even if charging is continued for fully charging the battery 13 (for example, SOC=80%) until the supply voltage reaches 400 V, the voltage drop $\Delta$Va of 2 V in the charging cable 14 allows the receiving voltage Vr of the battery to reach only 398V. Thus, even if the battery 13 is in a poor charge state (SOC 50%), the electric charger mistakenly determines that the battery 13 is fully charged and terminates charging.

In order to address this problem, the charging control unit 48, which serves as a resistance calculating unit, a drop calculating unit, a charge state determining unit and a determination value updating unit, calculates the voltage drop $\Delta Va$ of the charging cable 14 and also updates the determination value Xb with which the supply voltage of the electric charger is to be compared based on the voltage drop $\Delta Va$. Specifically, the charging control unit 48 firstly calculates the electric resistance R of the charging cable 14 in order to calculate the voltage drop $\Delta Va$. Upon the calculation of the electric resistance R, a voltage difference $\Delta V$ between the supply voltage Vs and the receiving voltage Vr is calculated. The electric resistance R is calculated using the voltage difference $\Delta V$ and the supply current Is ($R=\Delta V/Is$). Note that the receiving current. Ir may alternatively be used instead of the supply current. Is. Furthermore, the electric resistance R is used here as the conduction resistance of the charging cable 14, but the present invention is not limited to this. If the charging cable 14 exhibits an impedance Z as the conduction resistance, the impedance Z may be used instead of the electric resistance R. In the above description, the electric resistance R is calculated using the receiving voltage Vr and the supply voltage Vs. In order to use the receiving voltage Vr and the supply voltage Vs detected by the voltage sensors 30 and 45, it is necessary to eliminate noise effects by applying a filtering process such moving averaging and weighted moving averaging.

Figure 6:
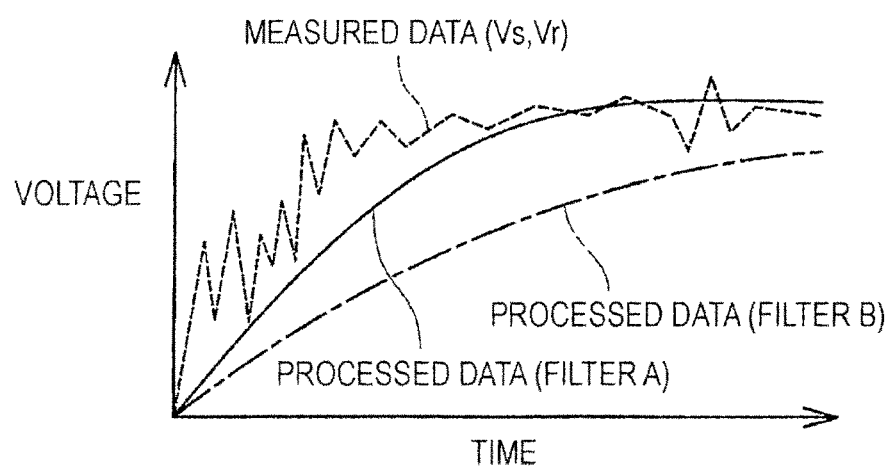
FIG. 6 is a diagram showing an effect of a filtering process on a receiving voltage and a supply voltage.

FIG. 6 is a diagram showing an effect of a filtering process on the receiving voltage Vr and the supply voltage Vs. As shown in FIG. 6, if measured data detected by the voltage sensors 30 and 45 are subjected to the filtering process and then further processed, a time lag occurs between the measured data and the processed data. The time lag due to the filtering process changes depending on the contents of the filtering process. Thus, if a filtering process applied to the receiving voltage Vr of the electric vehicle differs from a filtering process applied to the supply voltage Ds of the electric charger, a time lag occurs between the receiving voltage data Dr based on the receiving voltage Vr and the supply voltage data Ds based on the supply voltage Vs. Therefore, in order to correctly calculate the voltage difference $\Delta V$ by comparing the supply voltage data Ds and the receiving voltage data Dr, it is necessary to determine the time lag and synchronize the supply voltage data Ds and the receiving voltage data Dr before comparing them. Note that in the present embodiment the charging control unit 48 serves as a supply-side processing unit for calculating the supply voltage data Ds as well as a receiving-side processing unit for calculating the receiving voltage data Dr. Furthermore, the charging control unit 48 receives the receiving voltage Vr of the electric vehicle from the vehicle control unit 33 via the communication line 32 and 47.

Figure 7:
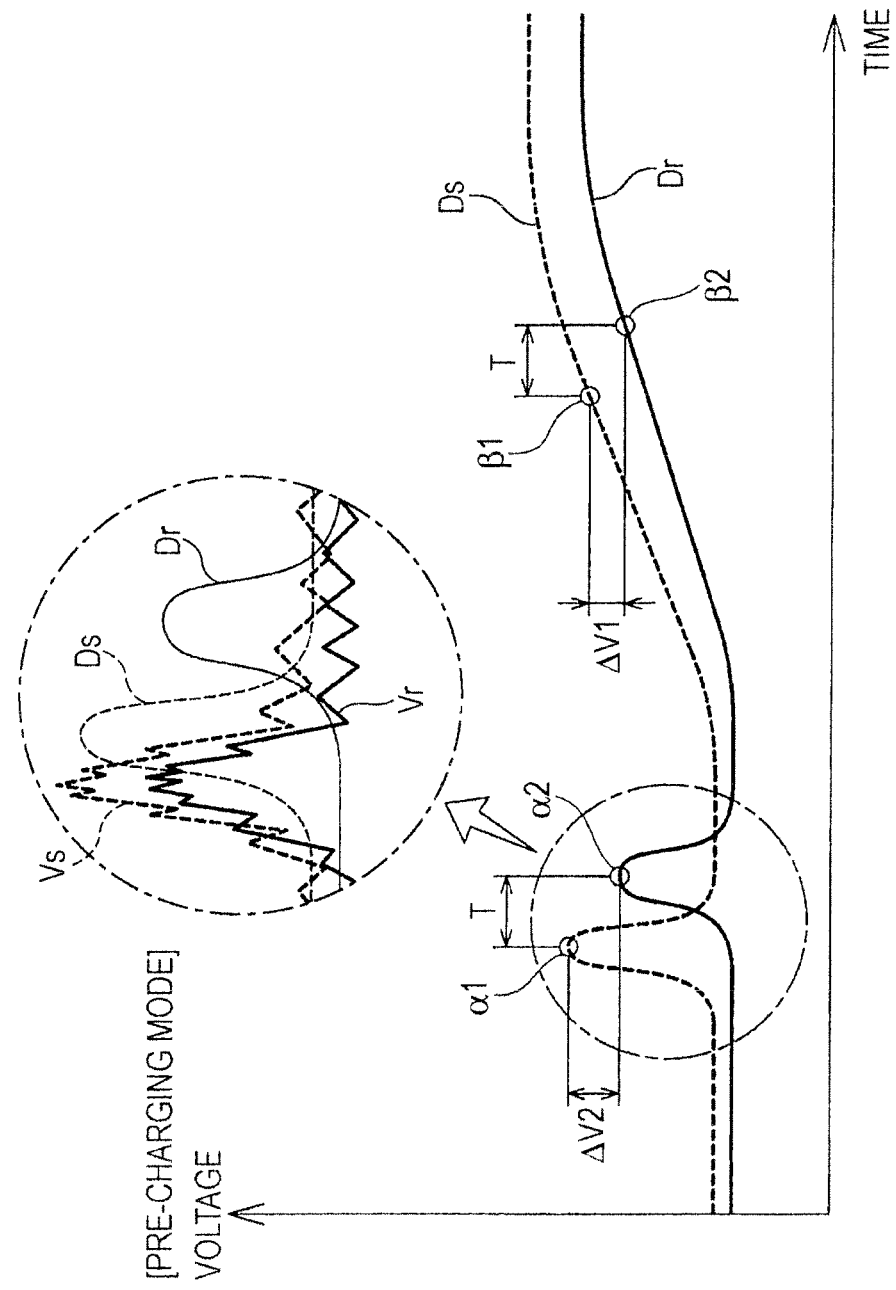
FIG. 7 is a diagram showing a change in supply voltage data and receiving voltage data in a pre-charging mode.

A procedure will be hereunder explained for comparing the supply voltage data D based on the supply voltage Vs and the receiving voltage data Dr based on the receiving voltage Vr after synchronizing them so as to calculate the voltage difference $\Delta V$ between the supply voltage Vs and the receiving voltage Vr with a high degree of accuracy. Firstly, the charging control unit 48 performs a pre-charging mode for calculating the voltage difference $\Delta V$ between the supply voltage data Ds (the supply voltage Vs) and the receiving voltage data Dr (the receiving voltage Vr) in prior to a full-charging mode for charging the battery 13 to a fully-charged state. FIG. 7 is a diagram showing a change in the supply voltage data DS and the receiving voltage Dr data in the pre-charging mode. As shown in FIG. 7, the charging control unit 48, which serves as a feature point assigning unit, temporarily raises and drops the supply voltage Vs using the power converting unit 41. Since the power receiving lines 28 and 29 are connected to the power supply lines 43 and 44, the receiving voltage Vr temporarily rises and falls in conjunction with the supply voltage Vs at a same timing, as shown in an enlarged portion of FIG. 7. Accordingly, the supply voltage data Ds which is obtained by applying the filtering process to the supply voltage Vs is represented with a curve having an upward convex, while the receiving voltage Dr data which is obtained by applying the filtering process to the receiving voltage Vr is also represented with a curve having an upward convex. In other words, changing the supply voltage Vs assigns a feature point $\alpha 1$ to the supply voltage data Ds and a feature point $\alpha 2$ to the receiving voltage Dr. The supply voltage Vs is changed by, for example, artificially changing the supply current. Is using the power converting unit 41.

Since the feature point $\alpha 1$ assigned to the supply voltage data Ds and the feature point $\alpha 2$ assigned to the receiving voltage Dr indicates a same timing, as described above, the charging control unit 48, which servers as a data synchronizing unit, measures a temporal distance between the feature points $\alpha 1$ and $\alpha 2$ to calculate a time lag T between the supply voltage data Ds and the receiving voltage data Dr due to the filtering process (for example, 0.5 seconds). Then, the supply voltage data Ds ($\beta 1$ in FIG. 7) and the receiving voltage Dr ($\beta 2$ in FIG. 7) are compared with the time lag T being taken into account. Thus, the supply voltage data Ds and the receiving voltage Dr at the same timing can be compared, whereby a voltage difference $\Delta V1$ between the supply voltage data Ds and the receiving voltage Dr is calculated with a high degree of accuracy. Furthermore, since the feature points $\alpha 1$ and $\alpha 2$ are assigned to the supply voltage Ds and the receiving voltage Dr by artificially changing the supply voltage Vs and the receiving voltage Vr, it is possible to examine whether the voltage sensors 30 and 45 operate properly. Based on the voltage difference $\Delta V1$ and the supply current is upon the calculation of the voltage difference $\Delta V1$, the charging control unit 48 calculates the electric resistance R of the charging cable 14. In the above explanation, the voltage difference $\Delta V1$ is calculated based on the supply voltage data Ds and the receiving voltage Dr after the feature points $\alpha 1$ and $\alpha 2$ are assigned to the supply voltage data Ds and the receiving voltage data Dr. However, the present invention is not limited to this. Alternatively, as shown in FIG. 7, a voltage difference $\Delta V2$ may be calculated upon assigning the feature points $\alpha 1$ and $\alpha 2$.

In the above explanation, the receiving voltage Vs is changed in accordance with the artificially-changed supply voltage Vs. However, the present invention is not limited to this. Alternatively, the receiving voltage Vr may be artificially changed and the supply voltage Vs may be changed in accordance with the artificially-changed receiving voltage Vr. In this case, the receiving voltage Vr can be artificially changed by temporarily actuating an electric load installed in the electric vehicle 11 such as an electric. Further, while the supply voltage Vs is temporarily raised and dropped in the above explanation, the present invention is not limited to this. Alternatively, the raised supply voltage Vs may be maintained. Furthermore, the supply voltage Vs and the receiving voltage vr are raised in the above explanation, the present invention is not limited to this. Alternatively, the supply voltage Vs and the receiving voltage vr may be lowered. Furthermore, while the above description uses inflection points of the supply voltage data Ds and the receiving voltage data Dr as the feature points $\alpha 1$ and $\alpha 2$, the present invention is not limited to this. Alternatively, a feature point may be set at a point at where a predetermined voltage change amount or a voltage change speed is exceeded (or undershot) or a point at where a predetermined voltage value is exceeded (or undershot). Furthermore, an inflection point may be identified by changing the supply current instead of the supply voltage. For example, the inflection point can be identified by monitoring a degree of rise in an operation where, for example, the supply current is raised to a predetermined current value in a relatively short time and then maintained.

Figure 8:
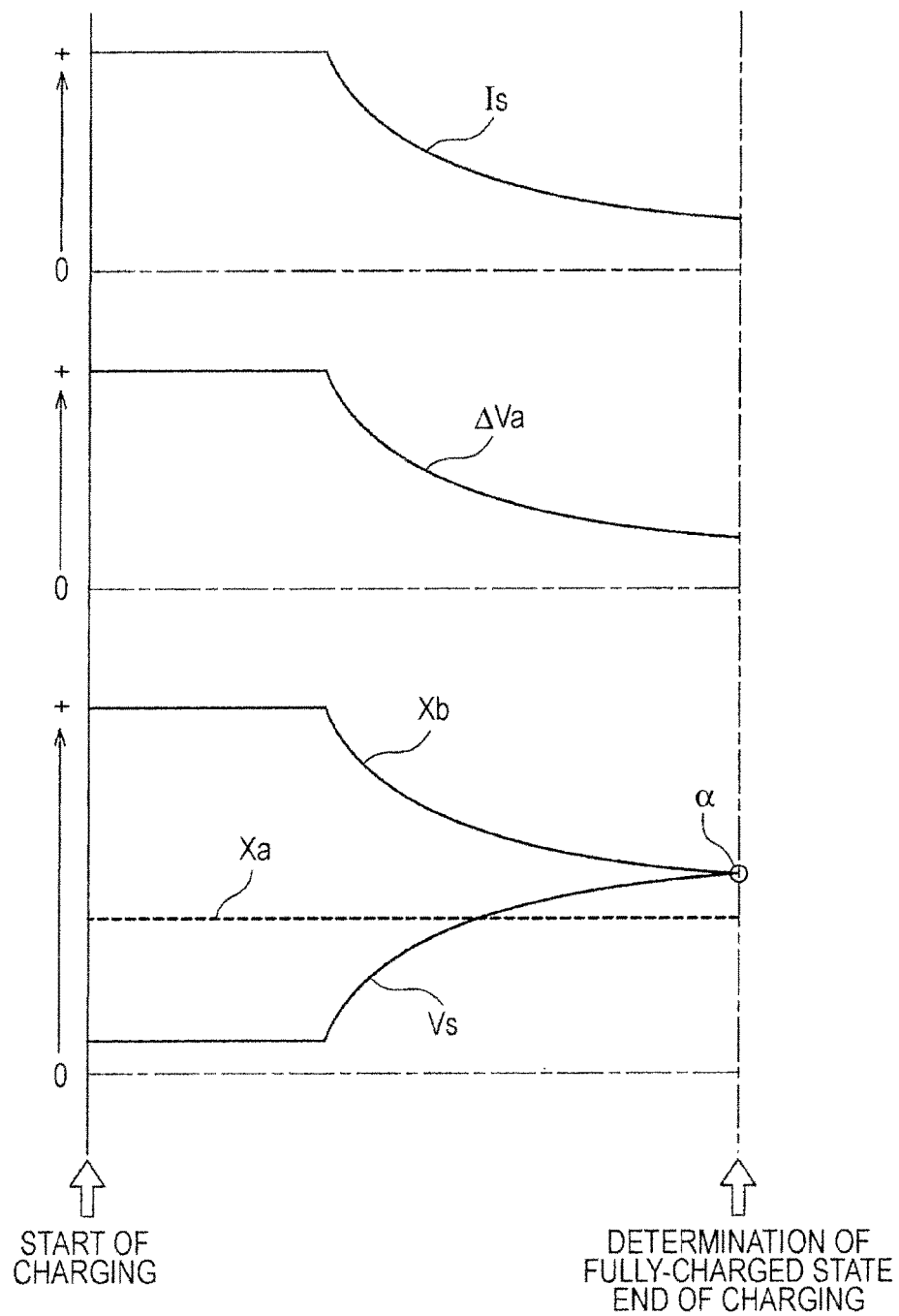
FIG. 8 is a diagram showing a change in a determination value from the start of charging to the end thereof.

When the electric resistance of the charging cable 14 is calculated in the pre-charging mode as described above, the charging control unit 48 calculates a voltage drop ΔVa of the charging cable 14 in the subsequent full-charging mode based on the supply current upon charging (ΔVa=Is×R). Then, based on the voltage drop ΔVa, the charging control unit 48 calculates the determination value Xb with which the supply voltage Vs is to be compared by adding the voltage drop ΔVa to a preset determination base value Xa (Xb=Xa+ΔVa). FIG. 8 is a diagram showing a change in the determination value Xb from the start of charging to the end thereof. Since a charging resistance of the battery 13 increases along with the shift from the start of charging to the fully-charged state, the supply current Is of the electric charger 12 gradually decreases as shown in FIG. 8. Further, since the voltage drop ΔVa of the charging cable 14 decreases as the supply current Is decreases, the determination value Xb, which is calculated based on the voltage drop ΔVa, also decreases. When the charging control unit 48 confirms that the supply voltage Vs reaches the determination value Xb, as shown with reference numeral α, the charging control unit 48 determines that the battery 13 has reached the fully-charged state and terminates charging control.

Figure 9:
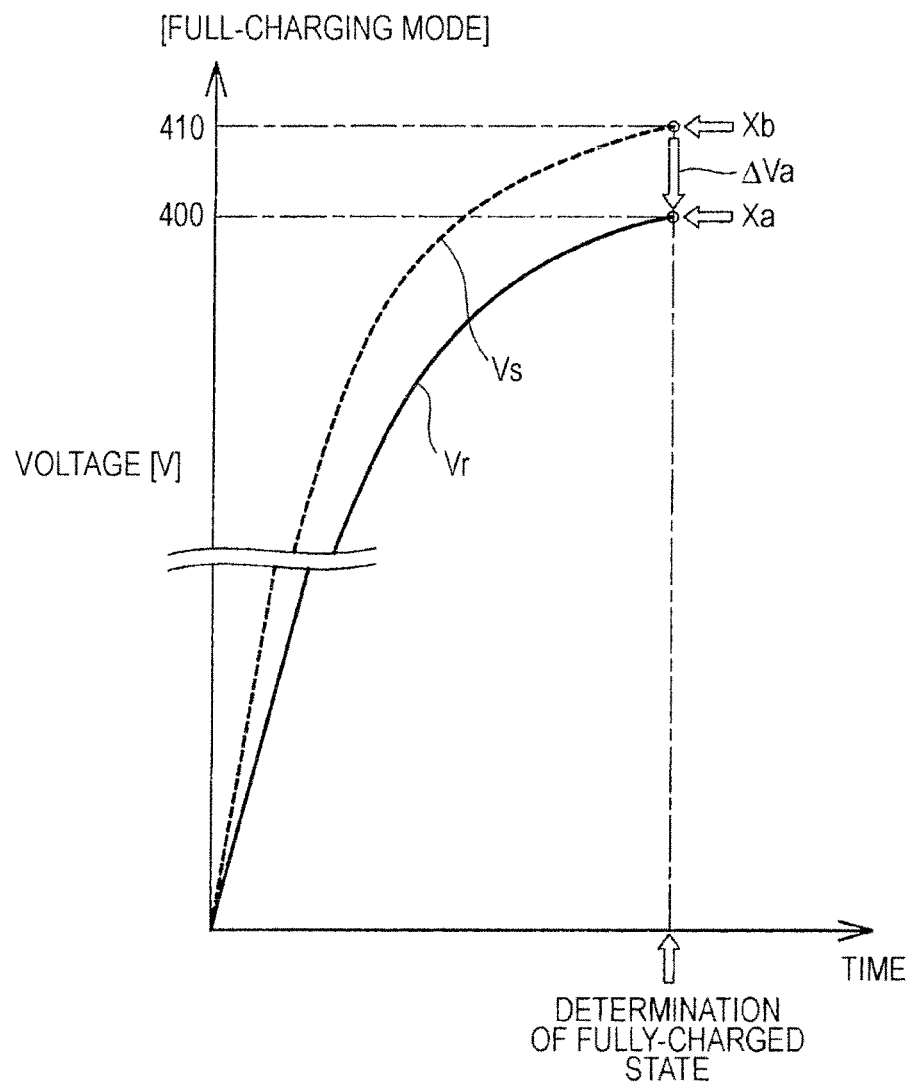
FIG. 9 is a diagram showing a transition of the supply voltage and the receiving voltage in a full-charging mode.

FIG. 9 is a diagram showing a transition of the supply voltage Vs and the receiving voltage Vr in the full-charging mode. As shown in FIG. 9, the determination value Xb with which the supply voltage is to be compared is increased by the voltage drop ΔVa of the charging cable 14, thereby allowing the determination of the fully-charged state of the battery 13 based on the supply voltage Vs and the determination value Xb. Specifically, the determination base value Xa is set to a battery voltage that corresponds to the fully-charged state of the battery 13 (for example, 400 V), whereby is determined that the receiving voltage Vr of the battery reaches the determination base value Xa when the supply voltage Vs reaches the determination value Xb (for example, 410 V). As a result, the increase in the determination value Xb by the voltage drop ΔVa prevents the charging control unit from erroneously determine that the battery 13 reaches the fully-charged state, whereby preventing a poor charge state of the battery 13. Furthermore, since the charging control unit 48 calculates the electric resistance R of the charging cable 14 based on the supply voltage Vs and the receiving voltage Vr, the voltage drop ΔVa can be obtained with a high degree of accuracy, whereby it is possible to update the determination value Xb with a high degree of accuracy. Specifically, since the length of the charging cable 14 is adjusted depending on a condition of a charging facility of the like, the electric resistance R is calculated in the pre-charging mode instead of being set in advance, whereby it is possible to update the determination value Xb with a high degree of accuracy. In the above explanation, the fully-charged state of the battery 13 is determined by comparing the supply voltage Vs with the determination value Xb. However, the present invention is not limited to this. Alternatively, the fully-charged state of the battery 13 may be determined by comparing the supply voltage data Ds with the determination value Xb.

The present invention is not limited to the aforementioned embodiment, and permits various modifications and alterations within the technical scope of the invention. In the above embodiment, the charging control unit 48 in the electric charger 12 serves as the resistance calculating unit, drop calculating unit, charge state determining unit, supply-side processing unit, receiving-side processing unit, feature point assigning unit, data synchronizing unit and voltage difference calculating unit. However, the present invention is not limited to this. For example, the vehicle control unit 33 in the electric vehicle 11 may serves as the resistance calculating unit, drop calculating unit, charge state determining unit, supply-side processing unit, receiving-side processing unit, feature point, assigning unit, data synchronizing unit and voltage difference calculating unit. Further alternatively, the charging control unit 48 and the vehicle control unit 33 may share the functions of the resistance calculating unit, drop calculating unit, charge state determining unit, supply-side processing unit, receiving-side processing unit, feature point assigning unit, data synchronizing unit and voltage difference calculating unit.

In the above description, the fully-charged state is reached when the SOC is 80%. However, the fully-charged state is affected by a designed usage range of the battery (an upper limit of the SOC) and thus is not limited to she case where the SOC is 80%. Further, moving averaging and weighted moving averaging are referred to as the filtering process for calculating the receiving voltage data Dr and the supply voltage data Ds, but the present invention is not limited to this. Furthermore, filtering may be applied in a hardware sense using an electric circuit or in a software sense using a program. Furthermore, the filtering process such as moving averaging may also be applied in the case where the supply current Is and the receiving current Ir detected by the current sensors 31 and 46 are used.

The illustrated electric vehicle 11 is an electric vehicle which only has the motor-generator 20 for propulsion, but may be a hybrid-type electric vehicle that includes a motor-generator and an engine for propulsion. Further, the battery 13 including a lithium-ion rechargeable battery, a nickel metal hydride rechargeable battery or the like is used as the electric storage device, but the present invention is not limited to this. Alternatively, a capacitor such as a lithium-ion capacitor and an electric double layer capacitor may be used as the electricity storage device. Furthermore, the electric charger 12 in the above explanation is a conductive-type charger whose charging cable 14 is equipped with the power supply connector 42 of contact type, but the present invention is not limited to this. Alternatively, an inductive-type charger may be used whose charging cable is equipped with a power supply connector of non-contact type.

What is claimed is:

1. An electric charging system that connects an electric charger and an electric vehicle via a charging cable and charges an electric storage device mounted on the electric vehicle, the electric charging system comprising:
   an electric charger, comprising:
      a power converter configured to convert AC power received from an external power source to DC power, and comprising a positive electrode and a negative electrode electrically connected to two power supply lines, respectively,
      a supply-side voltage sensor connected to the two power supply lines and configured to detect supply voltage values, a charging controller comprising a supply-side processor communicable with a vehicle controller mounted on the electric vehicle and the supply-side voltage sensor, and a housing accommodating the power converter, the supply-side voltage sensor, and the charging controller, and provided outside of and separately from the electric vehicle; and a charging cable comprising:

a free edge including power supply connectors electrically connected to the power converter with the two power supply lines, the power supply connectors being connectable to charging connectors of the electric vehicle, a fixed edge fixed to the housing, and an elongated portion extended between the free edge and the fixed edge, and provided outside of and separately from the electric vehicle;

wherein the supply-side processor is configured to:

when the power supply connectors are connected to charging connectors of the electric vehicle, cause the electric charger to supply the DC power to the electric vehicle through the charging cable at detected supply voltage values, cause the electric vehicle to receive the DC power at receiving side voltage values, and receive the detected supply voltage values from the supply-side voltage sensor;

generate detected supply voltage data indicating a change of the detected supply voltage values with respect to time;

generate processed supply voltage data by subjecting the detected supply voltage data to a filtering process;

when the power supply connectors are connected to the charging connectors of the electric vehicle, communicate with the vehicle controller, and receive receiving side voltage data indicating a change of the receiving side voltages with respect to time from the vehicle controller;

by temporarily varying a change rate of the detected supply voltage values with respect to time, generate a first feature point corresponding the varying of the change rate in the processed supply voltage data at a first time, and generate a second feature point corresponding the varying of the change rate in the receiving side voltage data at a second time;

calculate a time lag between the first time and the second time;

calculate a voltage difference between the supply voltage and the receiving side voltage based on the time lag, the processed supply voltage data and the receiving side voltage data; and cause the electric charger to terminate supplying the DC power to the electric vehicle after determining that a charge state of the electric vehicle has reached a determination value.

2. The electric charging system according to claim 1, wherein the supply-side processor is further configured to calculate a conduction resistance of the charging cable based on the voltage difference, and calculate a determination value base on the conduction resistance of the charging cable, and wherein the conduction resistance is an electric resistance or an impedance of the charging cable.

3. The electric charging system according to claim 1, wherein the elongated portion of the charging cable comprises a communication line, and wherein the receiving side voltage data are transmitted to the electric charger via the communication line in the charging cable.

4. The electric charging system according to claim 1, wherein the supply-side processor is configured to:

by temporarily raising a change rate of the detected supply voltage values with respect to time, generate a first peak in the processed supply voltage data as the first feature point at the first time, and generate a second peak in the receiving side voltage data as the second feature point at the second time.

5. The electric charging system according to claim 1, wherein the supply-side processor is configured to:

by temporarily raising a change rate of the detected supply voltage values with respect to time, generate a first inflection point in the processed supply voltage data as the first feature point at the first time, and generate a second inflection point in the receiving side voltage data as the second feature point at the second time.

6. The electric charging system according to claim 1, wherein the supply-side processor is configured to:

eliminate one or more noise effects in the detected supply voltage data, by generating the processed supply voltage data by subjecting the detected supply voltage data to the filtering process.

7. A method for charging of an electric vehicle, comprising:

supplying DC power to the electric vehicle from the electric charging system according to claim 1.

* * * * *